United States Patent [19]

Bloor et al.

[11] Patent Number: 4,517,961
[45] Date of Patent: May 21, 1985

[54] SOLAR WATER HEATING APPARATUS

[76] Inventors: Trevor J. Bloor; Lawrence J. Walton, both of P.O. Box 388, Broadbeach, Queensland, Australia, 4217

[21] Appl. No.: 549,594
[22] Filed: Nov. 7, 1983

[30] Foreign Application Priority Data

Nov. 9, 1982 [AU] Australia .............................. PF6712

[51] Int. Cl.³ ................................................ F24J 3/02
[52] U.S. Cl. .................................. 126/450; 126/447; 126/448; 126/DIG. 2
[58] Field of Search ............... 126/450, 446, 447, 443, 126/448, 432, 417, DIG. 2; 165/173, 171, 175

[56] References Cited

U.S. PATENT DOCUMENTS

| 4,063,544 | 12/1977 | Bowen | 126/450 |
| 4,263,896 | 4/1981 | Zebuhr | 126/450 |
| 4,271,825 | 6/1981 | Schwob et al. | 126/450 |
| 4,291,682 | 9/1981 | Baratz | 126/450 |
| 4,345,587 | 8/1982 | Carvalho | 126/446 |

FOREIGN PATENT DOCUMENTS

| 2721964 | 11/1978 | Fed. Rep. of Germany | 126/446 |
| 55355 | 4/1982 | Japan | 126/450 |

Primary Examiner—James C. Yeung
Attorney, Agent, or Firm—Murray Schaffer

[57] ABSTRACT

A solar absorber assembly primarily for domestic hot water systems having an extruded base member adapted to be located on a sun exposed roof surface, the base member supporting a reflector member and having upwardly extending side portions for supporting a ducting member above the reflector member and a glazing member above the ducting member.

11 Claims, 4 Drawing Figures

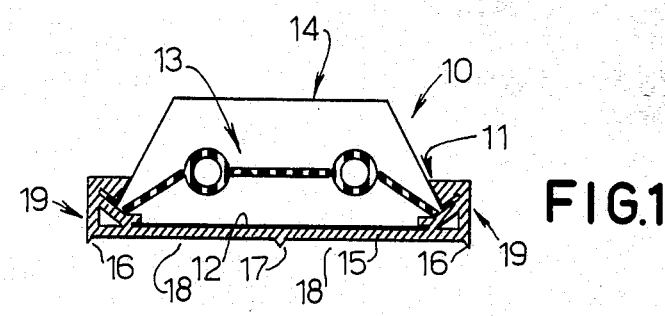
FIG.1
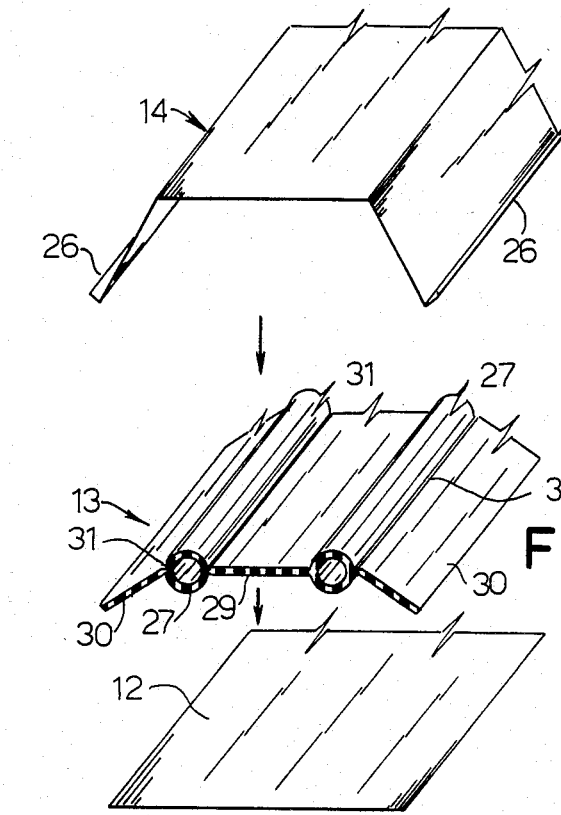
FIG.2
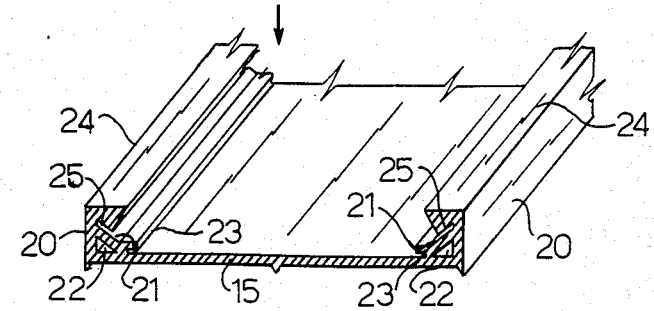

SOLAR WATER HEATING APPARATUS

THIS INVENTION relates to solar water heating apparatus.

Solar water heating apparatus of the type including a flexible plastics or other synthetic material absorber which is mounted on the roof of a building so that water flowing through the absorber receives heat directly from the sun and by conduction from the roof surface is known. In one arrangement the absorber comprises a plurality of multi-tube plastics duct members and the heating apparatus is particularly designed for use in heating water in swimming pools. This arrangement, however, while suitable in summer months for heating water, does not provide sufficient heated water in winter months in some climates because the temperature of the roof is not raised sufficiently by the sun.

To improve heating efficiency in such circumstances, transparent panels may be used to overlie the absorber so that heat loss from the absorber is minimised. However, although such an arrangement may be suitable for use on metal roofs where opposite ends of the panel may be supported by upstanding ribs of the roofing sheet, such panels are not particularly suitable for use in tiled roof installations because of the undulating nature of the roof and the lack of support ribs for supporting the panels. Furthermore, even with the use of panels in the above configuration, maximum heating of the ducting members and water flowing therethrough is not always achieved because the underlying roof surface tends to maintain the ducting members at a lower temperature.

Another difficulty associated with presently known solar heating apparatus such as that of the type disclosed in U.S. Pat. No. 4,269,172, arises with the mounting of the inlet and outlet manifolds. In many instances it is necessary to drill holes in the roofing material, for example roofing tiles, so that the manifolds may be fixed thereto by fixing devices. This arrangement is somewhat time consuming and often results in excessive damage to the tiles.

The present invention aims to overcome or at least alleviate some of the above disadvantages by providing solar water heating apparatus which enables water to be heated to a relatively high temperature and which is neat in appearance and reliable and efficient in use. The present invention also aims to provide an improved clip for supporting the inlet and outlet manifolds of solar heating apparatus on a roof. Other objects and advantages of the invention will become apparent from the following description.

With the above and other objects in view, this invention resides broadly in a solar absorber assembly including an elongated base member adapted to be supported on a sun exposed surface, said base member including a main body portion extending between upstanding side portions; an elongated ducting member having at least one fluid conducting passage extending therethrough, said ducting member being supported by said upstanding side portions of said base member so that said fluid conducting passage is spaced from said main body portion of said base member and a glazing member extending between and supported by said base member side portions and spaced upwardly from said fluid conducting passage.

In order that the invention may be more readily understood and put into practical effect, reference will now be made to the accompanying drawings which illustrate a preferred embodiment of the invention and wherein:

FIG. 1 is a sectional view of one form of absorber assembly for use in solar water heating apparatus according to the present invention;

FIG. 2 is an exploded perspective view showing the components of the absorber assembly illustrated in FIG. 1;

Figure 3:
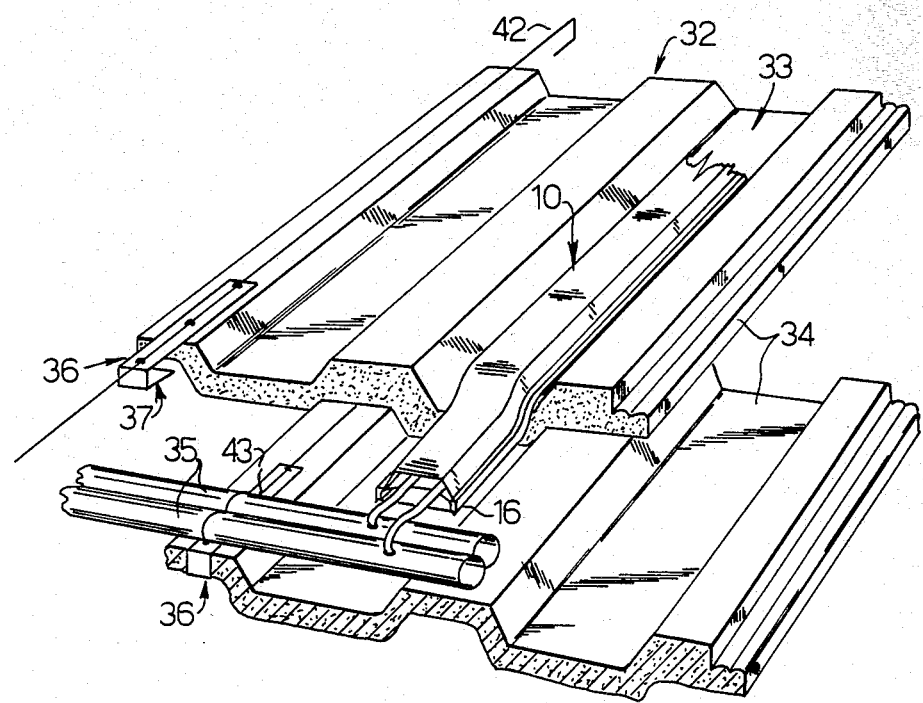
FIG. 3 is a part perspective view showing the absorber assembly supported on a tiled roof and communicating with a pair of manifolds fixed to the tiles by a manifold clip.

Referring to FIGS. 1 and 2 there is illustrated an embodiment of an absorber assembly 10 for use in solar water heating apparatus according to the present invention. The absorber assembly 10 includes a base member 11 which preferably supports a reflective member 12 a ducting member 13 and a glazing member 14. The base member 11 is provided with a planar support bed 15 having at each side respective downwardly dependent legs 16 and a central leg 17 which are adapted in use to support the absorber assembly 10 above a sun exposed supporting surface such as a roof of a building so that the assembly 10 is in minimum heat conducting contact therewith. Preferably the legs 16 and 17 are of a tapering nature as illustrated to further reduce heat transference between the absorber assembly and supporting surface. The legs 16 and 17 are further operative to define drainage areas 18 beneath the planar support bed 15 of the base member 11 to prevent condensation and resulting corrosion of the support surface which for example may be metal roofing sheets of a roof.

The base member 11 further includes a pair of integrally formed upstanding side support portions 19 which are adapted to constrain the reflective member 12 in use and support the ducting member 13 and the glazing member 14. Each side support portion 19 includes an upstanding side wall 20 and an inclined support wall 21 which defines with the side wall 20 and support bed 15 respective air pockets 22, the purpose of which is to break the heat conduction path between the ducting member 13 and the remainder of the base member 11.

The inclined wall 21 at each side is extended to define an inwardly projecting finger member 23 which is adapted, in use, to hold down the edges of the reflective member 12 on the support bed 15 of the base member 11. Each support portion 19 also includes an inwardly extending integrally formed bead member 24 which defines with the inclined side wall 21 a slot 25 for receiving an upturned flange 26 of the glazing member 14.

The ducting member 13 in this embodiment includes a pair of tubular members 27 which, in use, are adapted to communicate with respective water inlet and outlet manifolds 28 (see FIG. 3) to enable water to flow therethrough. The tubular members 27 are interconnected by a central integral web 29 and a pair of integral downwardly extending side webs 30 are disposed on the outside of each tubular member 27 so that in use, the side webs 30 support the ducting member 13 on the inclined wall 21 of the base member 11 so that the tubular members 27 are spaced from the base bed 15 and reflective member 12 supported thereon. Preferably each web 29 and 30 is joined to the respective members 27 by a weakened portion 31 so that each web can be easily stripped from the tube. The glazing member 14 formed of transparent or translucent material is preferably formed into the shape illustrated having upturned edge flanges 26 so that in the assembled absorber 10, the glazing member flanges 26 will be received in the slots 25 and function to lock the components of the absorber 10 in place and prevent heat loss from the ducting member 13.

In use and as shown in FIG. 3, the absorber assembly 10 may be supported on a tiled roof surface 32 in this instance in the recesses 33 defined by respective tiles 34 and the respective tubular members 27 connected to the respective water inlet and outlet manifolds 35 and interconnected at their remote ends, preferably by the connection means disclosed in our co-pending U.S. application Ser. No. 475,317 so that water flows from the inlet manifold to the outlet manifold through the tubular members 27. The downwardly extending legs 16 and 17 on the base member 11 ensure that the assembly 10 is raised above the surface of the roof tiles so that little or no heat is lost from the absorber 10 to the roof. Furthermore the combination of the reflective member 12 and the glazing member 14 will ensure that maximum heat is retained within the hollow space defined between the glazing member 14 and the base member bed 15 so that maximum heat will be transferred to the ducting member 13 and water flowing in the tubular members 27.

Preferably the base member 11 and the ducting member 13 are flexible extruded members formed of synthetic material such as plastics or synthetic rubber, for example Ethylene-Propylene-Diene-Monomer (E.P.D.M.) whilst the reflective member 12 is preferably a flexible fibreglass reinforced foil material. Alternately, the reflective strip may be a solid relatively rigid member. The reflective strip may also have adhesive applied to its underside to ensure adherence to the bed 15 of the base member 11. The glazing member 14 is preferably formed of LEXAN polycarbonate material, however it may also be formed of fibreglass material or any other transparent or translucent material.

It will be seen that the components of the absorber assembly when extruded or formed in indeterminate lengths may be cut to size to fit any roof. The glazing member 14 may be either formed to the desired shape on site or in the factory prior to being assembled with the other components of the absorber assembly. It will of course be realised that many other materials may be used for the components of the absorber assembly and furthermore, any number of tubes may be used in the ducting member 12 as desired. Furthermore, the glazing member 14 may be of other shapes than that illustrated, for example of domed form. The absorber assembly 10 may also be laid on the raised portions of the tiles 34 or alternately across the roof rather than in the tile recesses as illustrated in FIG. 2.

Figure 4:
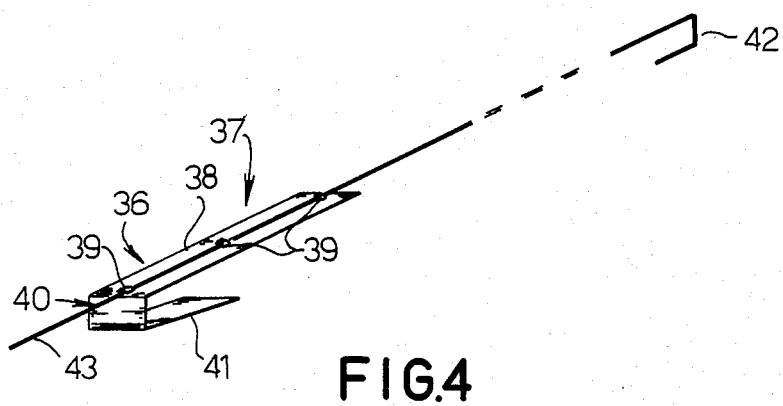
FIG. 4 is an enlarged view of the manifold clip illustrated in FIG. 3.

Preferably the manifolds 35 are fixed to the roofing tiles 34 by the manifold clip 36 shown in FIG. 3 and FIG. 4. The manifold clip 36 includes a jaw member 37 which is preferably formed of strip material such as galvanized metal or the like. The jaw member is of generally U-shaped form having one long leg 38 provided with a plurality of integrally formed eyes 39 to slidably receive an elongated wire 40 therethrough and a shorter leg 41 adapted to be located on the underside of a tile. The remote end of the wire is hooked at 42 and adapted to engage about the opposite end of the tile 34. In use and as shown in FIG. 3, the clip 36 is arranged so that the jaw member 37 and hooked portion 42 of the wire are located at opposite ends of a tile 34 whereafter the free end 43 of the wire is pulled outwardly relative to the jaw member 37 to move the jaw member 37 and hooked portion 42 into engagement with the opposite ends of the tile 34. The manifolds 35 are then located in position across the tiles and the free end 43 of the wire bent around the manifolds 35 and twisted about the portion of the wire between the eyes 39 so as to fix the manifolds 35 in position. It will be seen that as the wire is bent upwardly around the manifolds, the clip 36 will be locked to the tiles 34 and cannot be removed therefrom until the wire 40 is again untwisted permitting the hooked portion 42 and jaw member 37 to move apart.

Of course the clip described above may be used in connection with the solar water heating apparatus of the type disclosed in the aforesaid U.S. Pat. No. 4,269,172 as well as the type disclosed in our U.S. application Ser. No. 475,317. Furthermore the wire 40 may be slidably attached to the jaw member 37 by any suitable means. It will also be realised that the jaw member 37 may be other than of the form illustrated.

The above described solar water heating apparatus provides an arrangement which is not only efficient in heating water for domestic hot water purposes but which is also neat in appearance as compared to the conventional domestic hot water solar heaters. Furthermore the above arrangement reduces any excessive heat build-up below the roof which is often encountered in other arrangements as only the absorber itself is glazed rather than the whole roof or a large section thereof. In a modified form, the ducting member 13 may be provided with enlarged beads on the free ends of the webs 30 to improve its retention to the base member 11.

While the above has been given by way of illustrative example of the invention, it will of course be realised that many modifications and variations may be made to the above described embodiment by persons skilled in the art without departing from the broad scope and ambit of the invention as is defined in the appended claims.

We claim:
1. Solar water heating apparatus including an inlet header and an outlet header communicating through at least one solar absorber assembly, said absorber assembly including an extruded base member formed of flexible plastics material, said base member having a substantially planar floor portion, means integral with said base member for supporting said floor portion above a sun exposed supporting surface whereby said base member is in minimum heat conducting contact with said support surface; an extruded ducting member formed of flexible plastics material; means integral with said ducting member for supporting said ducting member above said floor portion of said base member, said ducting member including at least one integrally formed fluid conducting passageway extending longitudinally therethrough, said passageway interconnecting said inlet and outlet headers whereby water flowing into said inlet header passed through said passageway and into said outlet header, and an elongated glazing member operatively associated with said base member and supported above said floor portion of said base member to define therewith a hollow space surrounding said ducting member.

2. Solar water heating apparatus according to claim 1 and including a flexible reflective strip member supported on said planar floor portion of said base member to reflect heat towards said ducting member.

3. Solar waste heating apparatus according to claim 2 wherein said base member includes opposite inwardly extending finger means for overlying said reflective member to maintain said reflective member in position on said floor portion.

4. Solar water heating apparatus according to claim 1 wherein said inlet and outlet headers are arranged in side by side attitude and said at least one solar absorber assembly extends transversely away therefrom, and wherein said ducting member includes at least two said fluid conducting passageways connected at one end to the respective inlet and outlet headers and interconnected at their opposite end.

5. Solar water heating apparatus according to claim 1 wherein said base member includes a pair of upstanding integral side portions disposed at opposite sides of said planar floor portion and wherein said ducting member and said glazing member are supported in their operative attitude by said opposite side portions of said base member.

6. Solar water heating apparatus according to claim 5 wherein said upstanding side portions include inclined inwardly directed wall portions for engagement by said ducting member, said inclined wall portions defining with said floor portion air pocket means for reducing heat loss from said ducting member.

7. Solar water heating apparatus according to claim 6 wherein said support portions further include inwardly directed bead portions spaced above said inclined wall portion and defining slot means therebetween for receiving respective edges of said glazing member.

8. Solar water heating apparatus according to claim 1 wherein said means for supporting said base member floor portion above said sun exposed supporting surface include downwardly directed tapered feet portions.

9. Solar water heating apparatus according to claim 1 wherein said ducting member includes at least one pair of side by side longitudinally extending passageways, said passageways being interconnected by a central longitudinally extending web and there being provided downwardly inclined side web portions on opposite sides of said ducting member, said web portions engaging with said base member to support said fluid conducting passageways above said floor portion of said base member.

10. Solar water heating apparatus including juxtapositioned inlet and outlet manifolds and a plurality of solar absorber assemblies extending transversely away from said manifolds and arranged on a sun exposed roof, each said solar absorber assembly including an extruded base member formed of flexible plastics material, said base member including a main body portion and integrally formed feet portions supporting said main body portion above said sun exposed roof and in minimum heat conducting contact therewith; an extruded ducting member formed of flexible plastics material, said ducting member including a pair of longitudinally extending side by side fluid conducting passageways, said passageways being connected at one end to the respective inlet and outlet manifolds and being interconnected at their opposite ends whereby water flowing into said inlet manifold passes through said fluid conducting passageways to said outlet manifold; means integral with said ducting member for supporting said ducting member above said main body portion of said base member and an elongated glazing member operatively engaged with said base member and supported above the said main body portion of said base member and above said ducting member to define with said body portion a hollow space surrounding said ducting member.

11. Solar water heating apparatus according to claim 10 wherein said roof comprises a tiled roof defined by a plurality of overlapping tiles, each said tile having a depression therein adapted to be aligned with a corresponding depression in an adjacent tile whereby to define respective elongated depressions in said roof and wherein each said solar absorber assembly is located in a respective said elongated depression.

* * * * *